INVENTORS:
RONALD WILLIAM STANLEY
KINSEY and WILLIAM DENNIS
PERCY WEST

United States Patent Office 3,005,111
Patented Oct. 17, 1961

3,005,111
ELECTRIC CIRCUIT ARRANGEMENTS
Ronald William Stanley Kinsey and William Dennis Percy West, London, England, assignors to Siemens Edison Swan Limited, London, England, a British company
Filed Nov. 24, 1958, Ser. No. 776,084
Claims priority, application Great Britain Dec. 6, 1957
10 Claims. (Cl. 307—88)

This invention relates to electric circuit arrangements for controlling, basically, the application of an effective energising current through a load in dependence upon the coincident presence of two inputs, the more usual condition being that the load is thus energised when and only when the two inputs are present coincidentally, but the converse condition also being possible, namely that the load is energised except when the inputs are coincidentally present.

The invention is especially applicable to controlling a load requiring a relatively high energising current, for example an electromagnet, in dependence on relatively low current inputs derived, for example, from electronic devices such as cold cathode electronic tubes. Moreover the basic form of the invention may be expanded to afford selective control of a plurality of loads on what may be called a co-ordinate basis; that is, the loads are considered functionally (not physically) to be arranged matrix-wise in a number of rows and columns each of which has an input unit associated with it, the effective energisation (or de-energisation) of any selected load being brought about in response to the coincident presence of inputs in the two units respectively associated with the row and column of the selected load.

It is, of course, possible to control a relatively high energising current from one or more relatively low input currents by means of relays controlled by the input currents and having contacts in an energising circuit for the load. However, although such relays may give reliable service, they are slow in operation as compared with electronic devices and require careful maintenance. It is therefore an object of the present invention to permit the employment of magnetic amplifiers instead of relays in providing operational coupling between low current inputs and a load, such amplifiers being robust devices which have no moving parts, need little maintenance, and can be designed to respond considerably faster than relays, especially if the alternating current windings are energised from an alternating current source having a high frequency of the order, say, of 5000 cycles per second.

Basically, the present invention provides an electric circuit arrangement comprising a load device, a first input unit including an impedance element connected between one side of the load device and a first point intended to have a fixed potential, and a second input unit including an impedance element connected between the other side of the load device and a second point intended to have a fixed potential substantially different from that of the first point, which input units also include respective magnetic amplifiers each of which as an alternating current winding connected in circuit with rectifying means and the said impedance element in the appertaining unit to produce across that impedance element, when the magnetic amplifier is being supplied with alternating current and is in a saturated state (low impedance of its alternating current winding), a rectified voltage such that the potential at the near side of the load device is brought towards that of the fixed potential point on the other side of the load device, said magnetic amplifiers having respective control windings permitting saturation thereof by direct current inputs to these windings: the load has associated with it unidirectionally conductive means which permits current flow through the load between the input units in one direction only, which means may be constituted by the rectifying means already referred to.

Assuming that the load is to be effectively energised when input currents are coincidentally present in the control windings of the two magnetic amplifiers, the circuit arrangement functions as follows. In the quiescent state, that is, when neither magnetic amplifier has input current in its control winding and each is therefore in an unsaturated state with the impedance of its alternating current winding high, no significant voltage appears across the impedance elements in the input units and the potential of each of the two fixed potential points can be considered as appearing at the side of the load device nearer it. (Practical embodiments of the invention may include circuit elements which in fact prevent these potentials appearing at the sides of the load in the quiescent state, but it is convenient to consider them as so appearing in order to give a simple understanding of the manner in which the circuit functions.) The unidirectionally conductive means referred to is so poled as to prevent flow of current through the load device in consequence of the difference between the fixed potentials. With an input current applied to the control winding of one of the magnetic amplifiers such as to saturate it and thereby reduce the impedance of its alternating current winding to a low value, the impedance element in the appertaining input unit will receive maximum current from the A.C. supply and the (rectified) voltage drop then appearing across the impedance will bring the potential appearing at the nearer side of the load towards that at the other side. It is arranged, by appropriate choice of the fixed potentials and the A.C. supply voltage, that in these circumstances the resulting potential difference across the load device is insufficient, or of wrong polarity, to effectively energise it. If, however, saturating input currents are present in the control windings of both magnetic amplifiers coincidentally then the potential at each side of the load is taken toward the potential which appeared at the other side in the quiescent state, with the result that there appears across the load a potential difference of value commensurate with that appearing in the quiescent state but of reversed polarity. Consequently, since current flow through the load under the potential difference is not prevented by the unidirectionally conductive means, the load will be energised.

In carrying out the invention each input includes the aforesaid rectifying means by virtue of which the impedance element in the unit receives undirectional current from the A.C. supply when the alternating current winding of the associated magnetic amplifier is in its low impedance state: that is, the voltage drop produced across the impedance element will be unidirectional. The impedance element may be constituted by or connected in circuit with a smoothing or storage capacitor, in order that the voltage drop obtained thereacross, and thus the resulting potential applied at the near side of the load, will be substantially steady. Preferably such a capacitor and the aforesaid rectifying means are combined together in a voltage doubling rectifier circuit of known form comprising a first half-wave rectifier and capacitor connected to be fed in series from the A.C. supply through the alternating current winding of the magnetic amplifier in the input unit concerned, and a second half-wave rectifier and capacitor connected in series across the first rectifier with the second rectifier poled oppositely to the first, the second capacitor then constituting, or having connected across it, the said impedance element for the input unit.

In further describing practical embodiments and applications of the invention, reference will be made to the accompanying drawings in which.

Figure 1:
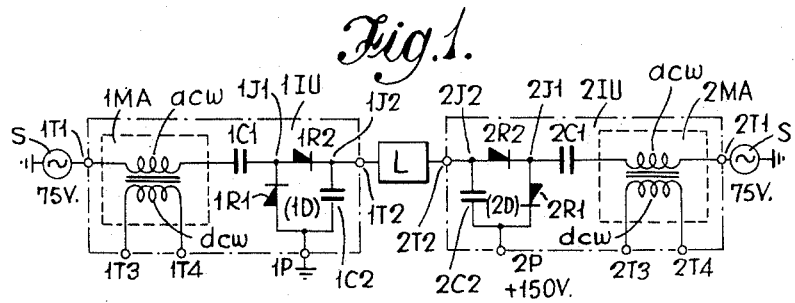
FIG. 1 is a circuit diagram illustrating a preferred embodiment of the basic circuit arrangement of the invention.

Referring to FIG. 1, a load device L, represented in block form, is associated with two input units 1IU, 2IU corresponding components of which will be referred to by like references distinguished in the drawing, and where necessary in the text, by a prefix 1 or 2 according to the particular unit, 1IU or 2IU respectively, in which they are included.

In each of the two input units 1IU and 2IU the alternating current winding $acw$ of a magnetic amplifier MA, a capacitor C1 and a half-wave rectifier R1 are all connected in series between a terminal T to which one side of an A.C. supply source S is connected (the other side being earthed) and a point P which will be given a fixed potential chosen as indicated hereinafter. A second rectifier R2 and capacitor C2 are connected in series, in that order, between the fixed potential point P and the junction J1 of the rectifier R1 and capacitor C1. The rectifiers R1, R2 and capacitors C1, C2 together constitute a voltage doubling rectifying circuit D which, when the magnetic amplifier MA is saturated by input current applied at terminals T3, T4 through a control winding $dcw$ thereon (the impedance of the alternating current winding $acw$ then being low), produces across the capacitor C2, that is, between the fixed potential point P and the junction point J2 between rectifier R2 and capacitor C2 a voltage which is approximately double the peak voltage of the applied A.C. voltage from the source S. The capacitor C2 corresponds to the impedance referred to in defining the invention hereinbefore and in the claims. The load device L is connected at terminals 1T2, 2T2 between the junction points 1J2 and 2J2 in the two input units 1IU, 2IU.

The fixed potential points 1P and 2P in the two units are given substantially different potentials, for instance earth and +150 volts respectively. The rectifiers 1R1, 1R2; 2R1, 2R2 in the two units are included in that order in a series connection extending through the load device L from the point 1P in unit 1IU to point 2P in unit 2IU. These rectifiers are all poled in the direction to oppose current flow through the load device L from the more positive of these points (2P as shown) to the other (1P). Thus with no input current applied to the control winding $dcw$ of either magnetic amplifier MA, so that the A.C. supplies S are effectively rendered ineffectual owing to the high impedance of the alternating current windings $acw$, negligible current flows through the load L and it therefore remains substantially unenergised.

It will be appreciated that the rectifiers R1 and R2 in each unit constitute both rectifying means by which a rectified voltage is produced across the capacitor C2, and also unidirectionally conductive means permitting current flow through the load L in one direction only.

Assuming that the fixed potential points P have the potentials already indicated, namely +150 volts for 2P and earth for 1P, a suitable voltage for the A.C. supplies S is 75 volts peak, these voltages having been indicated on the drawing but being understood to be given by way of example only. In the input unit 1IU, in which the fixed potential point 1P is earthed, the rectifiers 1R1 and 1R2 are so poled with respect to the A.C. circuit that, with the magnetic amplifier 1MA saturated in conse-quence of an applied input current through its control winding $dcw$, the doubled voltage (approximately 150 volts) produced across the capacitor 1C2 in the voltage doubling circuit 1D has a polarity such that the potential applied to the near side of the load device L from junction point 1J2 is raised to some 150 volts positive with respect to earth. On the other hand, in the input unit 2IU, the rectifiers 2R1, 2R2 are poled with respect to the associated A.C. circuit in the opposite sense, so that with saturating input current applied to the control winding $dcw$ of the magnetic amplifier 2MA, the voltage appearing across the capacitor 2C2 of the doubling circuit 2D, again approximately 150 volts, reduces the 150 v. potential at the fixed potential point 2P to approximately earth potential at the junction 2J2 and thus at the near side of the load device L. This action in unit 2IU takes place only if the potential at junction 1J2 in unit 1IU has been raised to 150 v. as described above: otherwise the +150 v. potential at point 2P backs off the rectifier 2R1 and prevents the voltage doubling action taking place in unit 2IU. It will be apparent that when the magnetic amplifiers MA of both input units 1IU and 2IU are saturated by the coincident presence of input currents in their control windings $dcw$ the load device L will be energised by the potential difference then produced across it between terminal 1T2 now at 150 v. positive, and terminal 2T2 now at earth potential: otherwise the load device L remains either unenergised or energised only to an ineffective extent.

Figure 2:
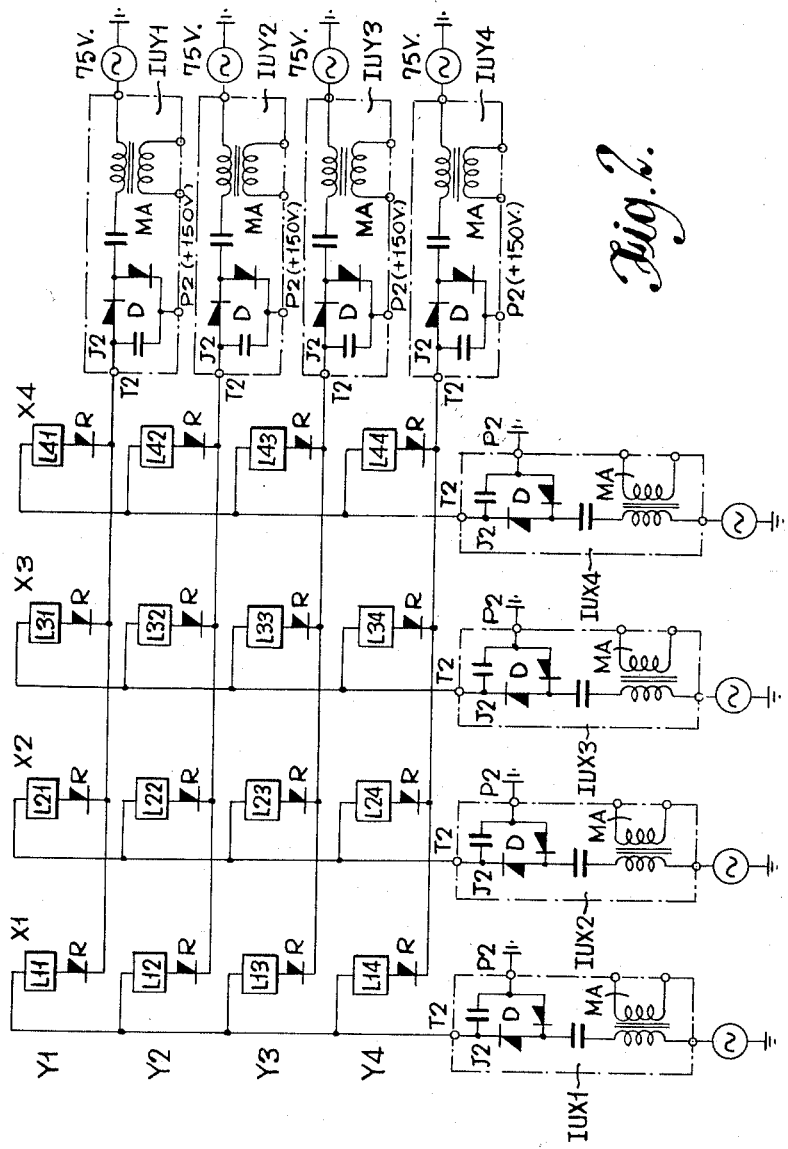
FIG. 2 illustrates an application of the invention for selective energisation of a plurality of loads on a co-ordinate basis.

Referring now to FIG. 2, in applying the invention for the selective energisation of a plurality of load devices L$xy$ ($x$=1, 2 . . . , $y$=1, 2 . . .) on a coordinate basis, the load devices are considered as being arranged matrix-wise in a number of intersecting columns X1, X2 . . . and rows Y1, Y2 . . . , each load device being at the intersection of a particular row with a particular column and having unique "co-ordinates" ($x$, $y$) corresponding to that column and row respectively. The load devices in each column, having the same ordinate X but different abscissae Y, are connected in common, on one side thereof, to an input unit IUX1, IUX2 . . . individual to that column: for instance the load devices L11, L12, L13, L14 . . . in column X1 are commoned on one side to the input unit IUX1. Likewise the load devices in each row, having the same abscissa Y but different ordinates X, are connected in common, on the other side thereof, to an input unit IUY1, IUY2 . . . individual to that row, the load devices L11, L21, L31, L41 . . . in row Y1 being, for instance, commoned on said other side to input unit IUY1. The input units IUX1 . . . , IUY1 . . . , each comprising a magnetic amplifier MA and a voltage doubling rectifier circuit D, similarly constituted to the input units 1IU, 2IU already described in connection with FIG. 1. The common connection of the load devices in any row or column is therefore made at terminal T2 to the junction point J2 in the doubling circuit D of the relevant input unit. The fixed potential points P in the input units IUX1, IUX2 . . . individual to the columns X1, X2 . . . are all given the same potential (for instance earth as shown), while the corresponding fixed potential points P in the units IUY1, IUY2 . . . individual to the rows Y1, Y2 . . . are all given a potential which is the same for all these latter units but substantially different from that for the other units, being for instance +150 volts as shown and in conformity with the example previously given in connection with FIG. 1. Consequently, as can be seen from consideration of FIG. 2, each load device is connected between a unique pair of input units which have different potentials applied to their fixed potential points, these units being those associated with the row and column respectively of the load device and being, for example, the units IUX2 and IUY3 in the case of load device L23. In other words each load device is effectively included in an individual circuit which conforms to the basic arrangement of the invention as described in connection with FIG. 1. Each load device can therefore be energised, in exactly the same way as before, by the coincident presence of input currents in the control windings of the respective magnetic amplifiers MA in the two input units concerned. Moreover any two or more of the load devices may be simultaneously energised by application of input currents to the requisite input units. To ensure that the flow of energising current for one load device cannot cause fortuitous energisation of another, an appropriately poled isolating rectifier R may be included in series with each load device between either side thereof and the common connection of that side to an input unit.

Figure 3:
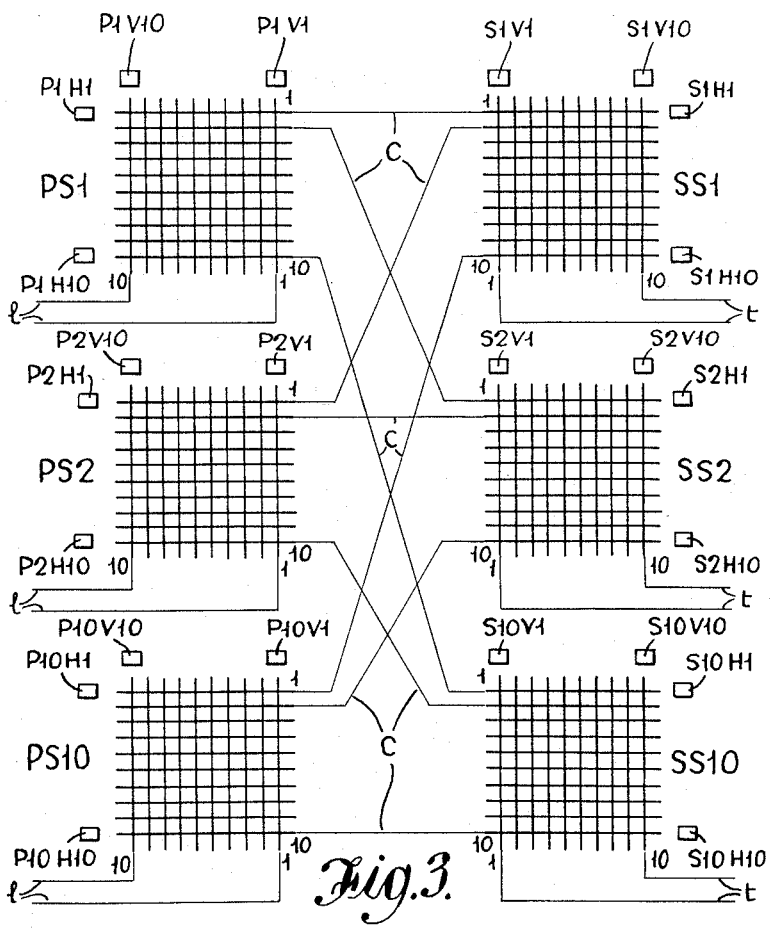
FIG. 3 is a schematic illustration of a cross-bar switching stage in an automatic telephone exchange.

It is contemplated that an important application of the invention in providing for selective energisation of load devices on a co-ordinate basis may be in connection with so-called cross-bar selective switching systems as sometimes employed for example in telephone exchanges. Cross-bar switches are well known in the telephone art and for the purposes of the present description it will be sufficient to say that they comprise a number of sets of contact pairs, usually a hundred or two hundred, arranged matrix-wise in a number of vertical rows, usually ten or twenty, with the (ten) contact sets in each column forming horizontal rows with the corresponding contact sets in the other columns. Corresponding contacts from the sets in each vertical row, usually the fixed contacts, are multipled together to form a so-called vertical multiple including a separate path for each contact pair in a set, while the remaining contacts can be, and in the present instance will be assumed to be, multipled along the horizontal rows to form multi-path horizontal multiples. Associated with each horizontal row is a so-called selecting electromagnet, and with each vertical row a so-called holding electromagnet. These electromagnets function in such a manner, which need not be considered here in detail, that energisation of a particular selecting magnet followed by energisation of a particular holding magnet, results in operation of the contact set at the intersection of the horizontal and vertical rows with which these energised magnets are respectively associated. Consequently each vertical multiple can be given selective access to any horizontal multiple by energising the appropriate selecting magnet and the appropriate holding magnet for operating the contact set at the intersection of the corresponding rows. In FIG. 3 a number of cross-bar switches, such as PS1, are shown diagrammatically as a matrix of vertical and horizontal lines representing the vertical and horizontal multiples just referred to, together with a block representation of some of the operating magnets identified by letters and numbers according to the switch, and the multiple in that switch, to which they relate. For instance in switch PS1 magnet P1H1 relates to the first horizontal multiple of that switch while magnet P1V10 relates to the tenth vertical multiple thereof.

Such cross-bar switches are employed to provide selective access between a number of connections $l$ (FIG. 3) at one side of a switching stage and a number of connections $t$ at the other side of the stage, each such connection comprising one or more wires (not shown) constituting separate conductive paths. For instance in a telephone exchange the connections $l$ at one side of a switching stage may be subscribers' lines or outgoing or incoming junctions, while the connections $t$ at the other side may be trunks extending to other switching stages in the exchange. Usually, and as assumed for FIG. 3, a cross-bar switching stage includes a primary section comprising a number of primary cross-bar switches PS1, PS2 . . . the horizontal multiples of which are connected over links $c$ to the horizontal multiples of a number of secondary cross-bar switches SS1, SS2 . . . constituting a secondary section of the switching stage, the connections $l$ and $t$ at the two sides of the stage being connected to the vertical multiples of the primary and secondary switches respectively. The links $c$ between the switches are so arranged that each primary switch PS1, PS2 . . . has one link $c$ extending from it to each of the secondary switches SS1, SS2 . . . , only some of the links being shown in FIG. 3. Thus in what may be considered as a basic arrangement, a cross-bar switching stage may comprise ten primary and ten secondary cross-bar switches having ten vertical multiples and ten horizontal multiples each, the primary and secondary switches being so interlinked between their horizontal multiples that the ten links (one per horizontal multiple) from each primary switch are spread over all the ten secondary switches, and vice versa. This basic switching arrangement, which has been assumed for FIG. 3 and which may be expanded to provide greater capacity or availability, will be considered in describing with reference to FIG. 4 an application of the invention for controlling on a co-ordinate basis the hold and select magnets in a cross-bar switching stage.

In the basic cross-bar switching stage of FIG. 3 there are ten hold magnets such as P1V1 and ten selecting magnets such as P1H1 in each switch, giving a total of a hundred of each on both the primary and the secondary side of the stage. Since each link $c$ extends between a particular horizontal multiple on a primary switch and a particular horizontal multiple on a secondary switch the establishment of a connection over such link involves the operation of a particular pair of selecting magnets, namely those relating to the horizontal multiples between which the link extends. For instance the establishment of a connection over the link $c$ between the tenth horizontal multiple in primary switch PS1 and the first horizontal multiple in secondary switch SS10 involves the operation of magnets P1H10 and S10H1. Consequently the two magnets of any such pair can be operated together. For this reason the hundred selecting magnets of the primary switches and the hundred selecting magnets of the secondary switches can be electrically coupled together in pairs (in series or parallel) in conformity with the arrangement of links. Thus in FIG. 4 the selecting magnets P1H1 and S1H1 are paired, as are the magnets P1H10 and S10H1, the magnets P10H1 and S1H10 and so on.

Figure 4:
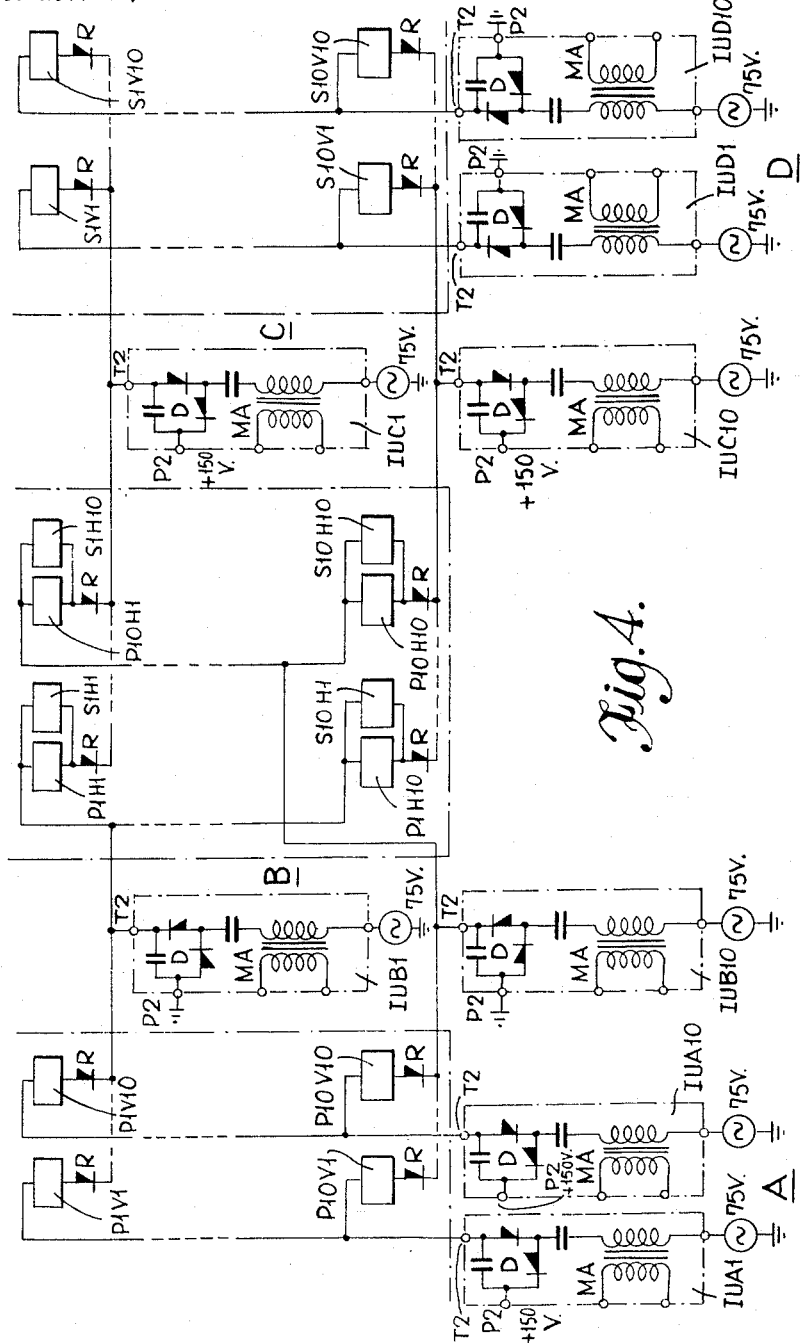
FIG. 4 illustrates an application of the invention for selective energisation on co-ordinate bases of the cross-bar switch operating magnets in FIG. 3.

Referring to FIG. 4, each of the two groups of a hundred holding magnets P1V1 . . . , S1V1 . . . , and likewise the group of a hundred pairs of selecting magnets P1HI/S1H1 . . . , is controlled on a co-ordinate basis by an arrangement involving four groups each of ten input units similarly constituted to those in FIG. 1. The groups of input units will be termed the A, B, C and D groups respectively, each unit being labelled according to its group and its number in the group: for example, unit IUB10 is the tenth unit of group B. The ten hold magnets P1V1 . . . P1V10 in the primary switch P1 are commoned together at one side and the common connection taken to an individual input unit IUB1 of group B. Likewise the ten hold magnets of each other primary switch are commoned on one side and connected to an individual unit of group B. The hold magnets such as P1V1 . . . P10V1 corresponding to each other in the several primary switches are commoned together at their other side and these common connections are taken to individual units in group A. In similar manner the hold magnets such as S1VI . . . S1V10 in each secondary switch are commoned together at one side with the common connection taken to an individual input unit of group C, while corresponding hold magnets such as S1V1 . . . S10V1 in the several secondary switches are commoned together at their other side with these common connections taken to individual input units in group D.

With these connections each group B input unit can be considered as relating to a particular primary switch and each group C input unit to a particular secondary switch. Since in the link arrangement assumed there is only one link c between any one primary switch and any one secondary switch, the pair of selecting magnets which relates to any particular link can evidently be controlled by the B and C input units relating respectively to the particular primary and secondary switches between which the link extends. The pairs of selecting magnets relating to links connected to any one primary switch (for instance pairs P1H1/S1H1 . . . P1H10/S10H1 which relate to links connected to switch P1) are therefore commoned together at one side to the group B input unit relating to that switch, while the pairs such as P1H1/S1H1 . . . P10H1/S1H10 relating to links connected to any one secondary switch (S1) are likewise commoned together at their other side to the group C input unit relating to this latter switch. Isolating rectifiers R are included in series with all the magnets for the purpose indicated in connection with FIG. 2. The fixed potential points P in the input units of groups A and C are given a potential which differs substantially from that given to the fixed potential points P in the input units of groups B and D; for instance this potential may be +150 volts in groups A and C and earth in groups B and D corresponding to the values assumed for FIG. 1, the A.C. supply to the input units being 75 volts peak as before. In this way each magnet is connected between a unique pair of input units in a circuit conforming to the basic circuit arrangement of FIG. 1 and can be selectively energised by the application of simultaneously present inputs to the two units of the pair.

In practice, the selection of the appropriate magnets for energisation in a cross-bar switching stage is sometimes effected in a reverse order, namely starting first with the hold magnets of the secondary switches, for reasons which are not relevant here and therefore need not be considered. With this order of selection the operation of the arrangement of FIG. 4 would be as follows: dependent on a particular connection selected at the secondary side of the stage, circuits are established for applying inputs to one of the group D input units and to one of the group C input units, thereby selecting for energisation the hold magnet which is associated with the vertical multiple to which the selected connection goes in one of the secondary switches. The established input circuit for the group D unit is not fully completed at this time as proper operation of a cross-bar switch requires that a selecting magnet should operate before a hold magnet. The group C input unit for which such input circuit is established corresponds to the last-mentioned secondary switch and thus to a particular group of ten links extending from this switch to the primary switches. One of these links is selected by the establishment of a circuit for applying an input to the relevant group B input unit, which in conjunction with the group C unit brings about energisation of the pair of selecting magnets associated with the selected link. This selected link goes to a particular primary switch, namely the one to which the group B unit receiving an input relates. To complete the selection of a connection through the switching stage, by way of the selected link, between the selected connection at the secondary side thereof and a required connection at the primary side, a circuit is established for applying an input to the group A input unit which corresponds to the particular vertical multiple to which said required connection goes in a primary switch of the stage. This group A unit acts in conjunction with the group B unit already receiving an input to bring about energisation of the hold magnet associated with the particular vertical multiple to which the primary side connection goes, and the group D for which an input circuit was established now acts in conjunction with the group C unit to bring about energisation of the hold magnet relating to the secondary switch vertical multiple to which the secondary side connection is connected. There is established a through connection between the secondary side connection and the required primary side connection by way of the relevant primary and secondary switches and the link between them. As indicated, it is arranged that the B and C input units actually receive their inputs before the A and D units in order to ensure that the select magnets operate before the hold magnets as is required.

As will be appreciated, if the cross-bar switches in the two switching sections in FIG. 3 had been inter-linked between vertical multiples instead of between horizontal multiples (the connections l and t to the stage being then taken to horizontal multiples), the hold magnets of the switches, rather than the select magnets, could have been paired for contemporaneous energisation as in FIG. 4. In general, therefore, with the cross-bar switches of two switching sections inter-linked between multiples of like character, that is, horizontal or vertical as the case may be, pairing of operating magnets for contemporaneous operation on a co-ordinate basis can be effected in respect of those operating magnets, also of like character, which relate to the inter-linked multiples, the remaining magnets, hold or selecting as the case may be, being energised on a co-ordinate basis without pairing.

What we claim is:

1. An electric circuit arrangement comprising in combination with a load a first input unit including an impedance connected between one side of the load and a point of fixed potential, and a second input unit including an impedance connected between the other side of the load and a second point having a different fixed potential, each of said input units also individually including terminal means for connection thereto of an energizing alternating current source, a magnetic amplifier having a control winding and an alternating current winding of which the latter winding is connected in circuit with the said impedance of the unit for energisation from said A.C. source, and rectifying means connected in circuit with said impedance with such polarity that, with the magnetic amplifier saturated and its alternating current winding therefore in a low impedance condition, the resultant, rectified, voltage drop produced by the A.C. source across the impedance will bring the potential at the near side of the load towards that of the fixed potential point on the other side, the load being associated with unidirectionally conductive means permitting current flow through the load between the supply units in one direction only.

2. A circuit arrangement as claimed in claim 1, wherein the said impedance element in each input unit is constituted by or connected in circuit with a capacitor affording a substantially steady voltage across it.

3. A circuit arrangement as claimed in claim 2, wherein the capacitor and the rectifying means in each unit are combined together in a voltage doubling and rectifying circuit.

4. An electric circuit arrangement including a load device and a pair of input units of which each unit comprises a voltage doubling and rectifying circuit including a capacitor across which will appear a rectified voltage of approximately twice the peak amplitude of an applied alternating current voltage, together with a magnetic amplifier having an alternating current winding connected to determine its effective impedance the application of an alternating current voltage to the doubling and rectifying circuit and a control winding energisable by a direct current input to reduce by saturating the magnetic amplifier the effective impedance of the alternating current winding, the said capacitors in the two input units being connected between opposite sides of the load device and respective points having different fixed potentials, and the rectification being so poled that the rectified voltage appearing across each capacitor brings the potential at the near side of the load device towards that of the fixed potential point at the other side.

5. An electric circuit arrangement including a plurality of load devices electrically arranged matrix-wise in a number of rows and columns and each associated with a pair of input units which are constituted as set forth in claim 1 and are individual to the load device as a pair but are common the one to all the load devices in the same row and the other to all the load devices in the same column, the fixed potential points of the input units for the several rows being all given the same potential as each other and the fixed potential points of the input units for the several columns being also all given the same potential as each other.

6. An electric circuit arrangement including a plurality of load devices electrically arranged matrix-wise in a number of rows and columns and each associated with a pair of input units which are constituted as set forth in claim 4 and are individual to the load device as a pair but are common the one to all the load devices in the same row and the other to all the load devices in the same column, the fixed potential points of the input units for the several rows being all given the same potential as each other and the fixed potential points of the units for the several columns being also given the same potential as each other.

7. A circuit arrangement as claimed in claim 6, wherein said load devices are respective operating magnets of like character belonging to a number of cross-bar selecting switches which together constitute a section of a cross-bar switching stage.

8. A circuit arrangement as claimed in claim 6, wherein said load devices are constituted by respective pairs of operating magnets of like character belonging to a number of cross-bar selecting switches which together constitute two inter-linked sections of a cross-bar switching stage having links extending between multiples of like character included in switches of the two sections respectively, each said pair of magnets relating to a particular link between the sections and being constituted by the magnets which respectively relate to the multiples between which that link extends.

9. A circuit arrangement as claimed in claim 5, wherein the said impedance element in each input unit is constituted by or connected in circuit with a capacitor affording a substantially steady voltage across it.

10. A circuit arrangement as claimed in claim 9, wherein the capacitor and the rectifying means in each unit are combined together in a voltage doubling and rectifying circuit.

References Cited in the file of this patent

UNITED STATES PATENTS

| | | |
|---|---|---|
| 2,072,278 | Schade | Mar. 2, 1937 |
| 2,172,962 | Montgomery | Sept. 12, 1939 |
| 2,590,950 | Eckert et al. | Apr. 1, 1952 |
| 2,691,151 | Toulon | Oct. 5, 1954 |
| 2,931,015 | Bonn | Mar. 29, 1960 |
| 2,931,016 | Bonn | Mar. 29, 1960 |